(12) United States Patent
Machii et al.

(10) Patent No.: US 11,123,812 B2
(45) Date of Patent: Sep. 21, 2021

(54) INSERT AND CUTTING TOOL

(71) Applicant: KYOCERA CORPORATION, Kyoto (JP)

(72) Inventors: Takafumi Machii, Satsumasendai (JP); Hironobu Shimonosono, Satsumasendai (JP)

(73) Assignee: KYOCERA Corporation, Kyoto (JP)

( * ) Notice: Subject to any disclaimer, the term of this patent is extended or adjusted under 35 U.S.C. 154(b) by 292 days.

(21) Appl. No.: 16/095,961

(22) PCT Filed: Apr. 25, 2017

(86) PCT No.: PCT/JP2017/016415
§ 371 (c)(1),
(2) Date: Oct. 24, 2018

(87) PCT Pub. No.: WO2017/188266
PCT Pub. Date: Nov. 2, 2017

(65) Prior Publication Data
US 2019/0134722 A1    May 9, 2019

(30) Foreign Application Priority Data

Apr. 25, 2016 (JP) .............................. JP2016-087152
Jun. 22, 2016 (JP) .............................. JP2016-123790
Aug. 31, 2016 (JP) ................................. 2016-168819

(51) Int. Cl.
*B23C 5/22* (2006.01)
*B23C 5/16* (2006.01)
(Continued)

(52) U.S. Cl.
CPC ............. *B23C 5/2243* (2013.01); *B23B 27/14* (2013.01); *B23B 27/16* (2013.01); *B23B 51/00* (2013.01);
(Continued)

(58) Field of Classification Search
CPC ......... B23B 27/14; B23B 27/16; B23B 51/00; B23C 2200/0455; B23C 2200/243;
(Continued)

(56) References Cited

U.S. PATENT DOCUMENTS 3,716,395 A * 2/1973 Bauer .................... D21H 27/26
428/530
5,709,907 A * 1/1998 Battaglia ............... B23B 27/146
427/126.1
(Continued)

FOREIGN PATENT DOCUMENTS

DE 202010009721 U1 10/2010
DE 102009039388 A1 4/2011
(Continued)

*Primary Examiner* — Sara Addisu
(74) *Attorney, Agent, or Firm* — Viering, Jentschura & Partner MBB

(57) ABSTRACT

An insert may include a base member and a resin layer located on the base member. The base member may include a first surface, a second surface, and a cutting edge. The first surface includes a rake surface region. The second surface may be adjacent to the first surface and includes a flank surface region. The cutting edge may be located in at least a part of a ridge line at which the first surface intersects with the second surface. The resin layer may not be located on the second surface but may be located on the first surface.

15 Claims, 17 Drawing Sheets

(51) Int. Cl.
*B23B 27/16* (2006.01)
*B23B 51/00* (2006.01)
*B23B 27/14* (2006.01)

(52) U.S. Cl.
CPC .................. *B23C 5/16* (2013.01); *B23C 5/22* (2013.01); *B23C 5/2256* (2013.01); *B23C 2200/0455* (2013.01); *B23C 2200/243* (2013.01); *B23C 2200/286* (2013.01); *B23C 2200/361* (2013.01); *B23C 2210/03* (2013.01); *B23C 2210/405* (2013.01)

(58) Field of Classification Search
CPC ........ B23C 2200/286; B23C 2200/361; B23C 2210/03; B23C 2210/405; B23C 5/16; B23C 5/22; B23C 5/2243; B23C 5/2256
See application file for complete search history.

(56) References Cited

U.S. PATENT DOCUMENTS

| | | | | |
|---|---|---|---|---|
| 6,187,421 | B1* | 2/2001 | Moriguchi | C23C 28/044 407/119 |
| 6,554,548 | B1* | 4/2003 | Grab | C22C 29/08 407/118 |
| 8,231,312 | B2* | 7/2012 | Omori | C23C 30/005 407/119 |
| 9,789,587 | B1* | 10/2017 | Mortensen | B24D 3/005 |
| 2002/0085888 | A1* | 7/2002 | Velpari | C03C 25/47 408/1 R |
| 2004/0228694 | A1* | 11/2004 | Webb | B23B 27/145 407/113 |
| 2004/0234349 | A1* | 11/2004 | Ueda | C23C 30/005 407/113 |
| 2006/0084253 | A1* | 4/2006 | Mizukoshi | H01L 24/91 438/584 |
| 2006/0147280 | A1* | 7/2006 | Sjogren | B23B 27/145 407/113 |
| 2007/0298230 | A1 | 12/2007 | Omori et al. | |
| 2008/0292366 | A1* | 11/2008 | Akama | G03G 15/0818 399/286 |
| 2013/0022420 | A1* | 1/2013 | Waki | C23C 28/42 407/115 |
| 2015/0367421 | A1* | 12/2015 | Yamamoto | C04B 35/5935 407/115 |
| 2018/0029145 | A1* | 2/2018 | Arumskog | B23B 51/00 |
| 2018/0087149 | A1* | 3/2018 | Matsuo | B23B 27/14 |
| 2019/0184472 | A1* | 6/2019 | Matsuyama | B23B 51/06 |
| 2019/0232380 | A1* | 8/2019 | Kanaoka | C23C 28/042 |

FOREIGN PATENT DOCUMENTS

| | | |
|---|---|---|
| JP | H11-000813 A | 1/1999 |
| JP | 2008105148 A | 5/2008 |
| JP | 2008-229839 A | 10/2008 |
| WO | 2006059551 A1 | 6/2006 |

\* cited by examiner

INSERT AND CUTTING TOOL

CROSS-REFERENCE TO RELATED APPLICATIONS

This application is a national stage entry according to 35 U.S.C. 371 of PCT Application No. PCT/JP2017/016415 filed on Apr. 25, 2017, which claims priority to: Japanese Application No. 2016-087152 filed on Apr. 25, 2016; Japanese Application No. 2016-123790 filed on Jun. 22, 2016; and Japanese Application No. 2016-168819 filed on Aug. 31, 2016; which are entirely incorporated herein by reference.

TECHNICAL FIELD

The present disclosure relates to inserts and cutting tools.

BACKGROUND

As a cutting tool used in a cutting process, a cutting tool including an attachable/detachable insert is discussed in, for example, Japanese Unexamined Patent Publication No. 11-000813 (Patent Document 1). As an insert used for a cutting tool, an insert which may include a base member composed of ceramics or sintered alloy, and a coating layer that coats the base member is discussed in, for example, Japanese Unexamined Patent Publication No. 2008-229839 (Patent Document 2).

A rake surface and a flank surface of the base member may be coated with the coating layer in the insert described in Patent Document 2. Therefore, during a cutting process, a processing surface of a workpiece may become corrupted due to contact between the workpiece and a part of the coating layer which coats the flank surface.

SUMMARY

In a non-limiting embodiment, an insert may include a base member and a resin layer located on the base member. The base member may include a first surface, a second surface, and a cutting edge. The first surface may include a rake surface region. The second surface may be adjacent to the first surface and includes a flank surface region. The cutting edge may be located in at least a part of a ridge line which the first surface intersects with the second surface. The resin layer may not be located on the second surface but may be located on the first surface.

DETAILED DESCRIPTION

Figure 1:
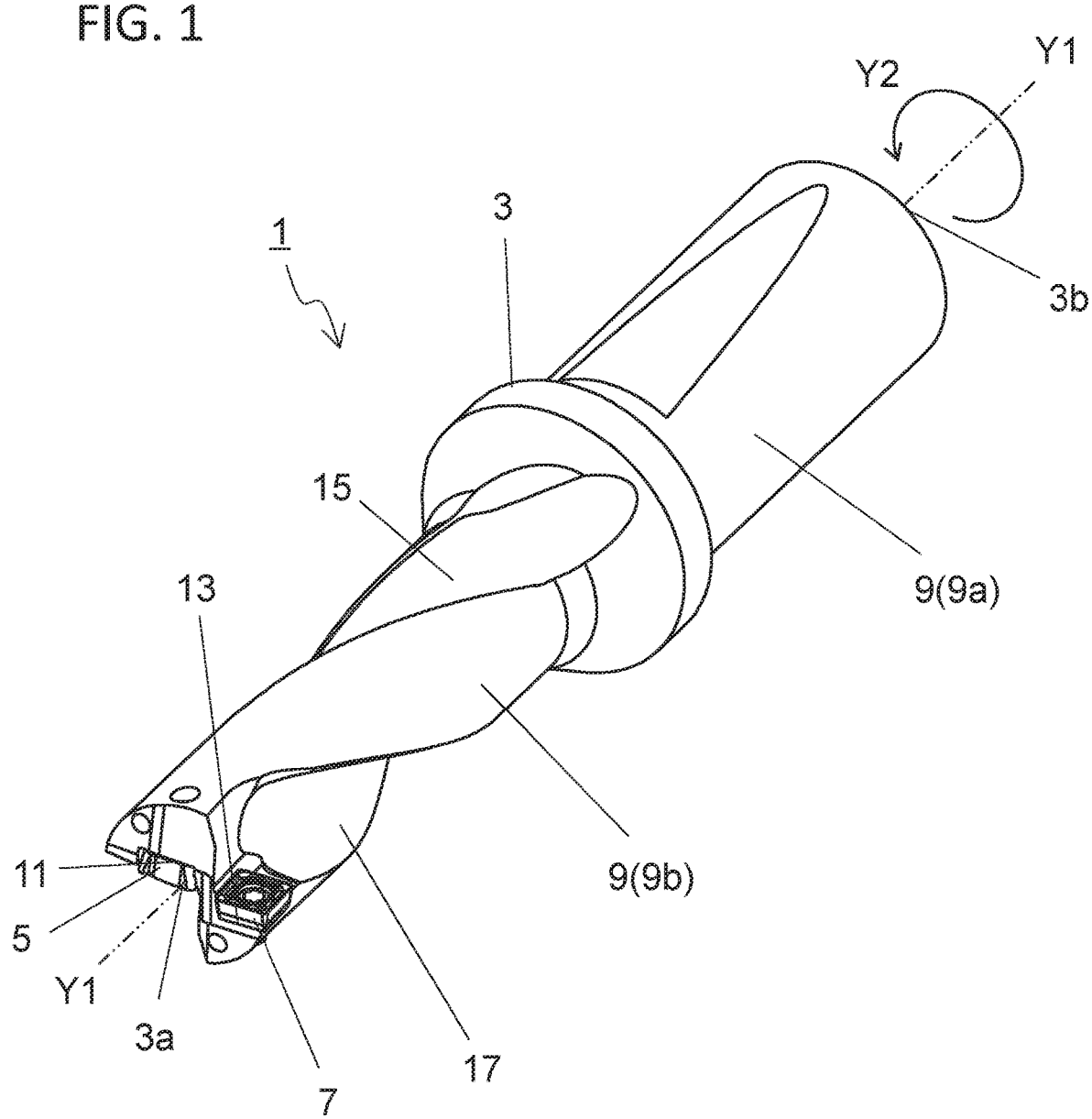
FIG. 1 is a perspective view illustrating a cutting tool.

Inserts and cutting tools in a plurality of non-limiting embodiments are respectively described in detail below with reference to the drawings. For the sake of description, the drawings referred to in the following illustrate, in a simplified form, only main members necessary for describing each of the non-limiting embodiments. The inserts and the cutting tools to be disclosed below are therefore capable of including any structural member not illustrated in the drawings referred to. Sizes of the members in each of the drawings are not ones which faithfully represent sizes of actual structural members and size ratios of these members.

The cutting tool 1 illustrated in FIG. 1 is a drill including a central cutting edge (inner cutting edge) and a peripheral cutting edge (outer cutting edge). The cutting tool 1 in the present non-limiting embodiment includes a holder 3, a first insert 5, and a second insert 7. The first insert 5 is an inner cutting edge insert, and the second insert 7 is an outer cutting edge insert. The first insert 5 and the second insert 7 are attachable to and detachable from the holder 3.

Firstly, the holder 3 is described in detail below. The holder 3 includes a main body 9, a first pocket 11, a second pocket 13, a first flute 15, and a second flute 17. The main body 9 is a bar-shaped body which extends from a first end 3a to a second end 3b, and is rotatable around a rotation axis Y1. The main body 9 is rotatable around the rotation axis Y1 during a cutting process. The first end 3a is usually called a front end, and the second end 3b is usually called a rear end in the holder 3. Therefore, the first end 3a is also referred to as the front end 3a, and the second end 3b is also referred to as the rear end 3b in the following description.

The main body 9 in the present non-limiting embodiment includes a holding member 9a which is held by, for example, a spindle in a machine tool and is called "shank", and a cutting member 9b called "body." The holding member 9a is a member to be designed according to a shape of the spindle and the like in the machine tool. The cutting member 9b is a member in which the first insert 5 and the second insert 7 are attached to the front end 3a. The cutting member 9b plays a major role in the cutting process of a workpiece. Arrow Y2 indicates a rotation direction of the main body 9.

As illustrated in FIG. 1, a plurality of pockets including a first pocket 11 and a second pocket 13 are located at a side of the front end 3a in the cutting member 9b. The first pocket 11 is a recess located at a side of the center when the holder 3 is viewed toward the front end 3a. The first insert 5 is located in the first pocket 11.

The second pocket 13 is a recess located closer to an outer periphery than the first pocket 11 when the holder 3 is viewed toward the front end 3a. The second insert 7 is located in the second pocket 13. The first pocket 11 is located away from the second pocket 13 in order to avoid contact of the first insert 5 with the second insert 7.

The first flute 15 extends spirally around the rotation axis Y1 in a direction from the first pocket 11 toward a side of the rear end 3b of the main body 9. The second flute 17 extends spirally around the rotation axis Y1 in a direction from the second pocket 13 toward a side of the rear end 3b of the main body 9. The first flute 15 and the second flute 17 are located on the cutting member 9b in the main body 9 and are not located on the holding member 9a.

As material of the main body 9, for example, steel, cast iron, or aluminum alloy is usable. Steel is suitable because of high rigidity.

The first insert 5 is described in detail below.

Figure 2:
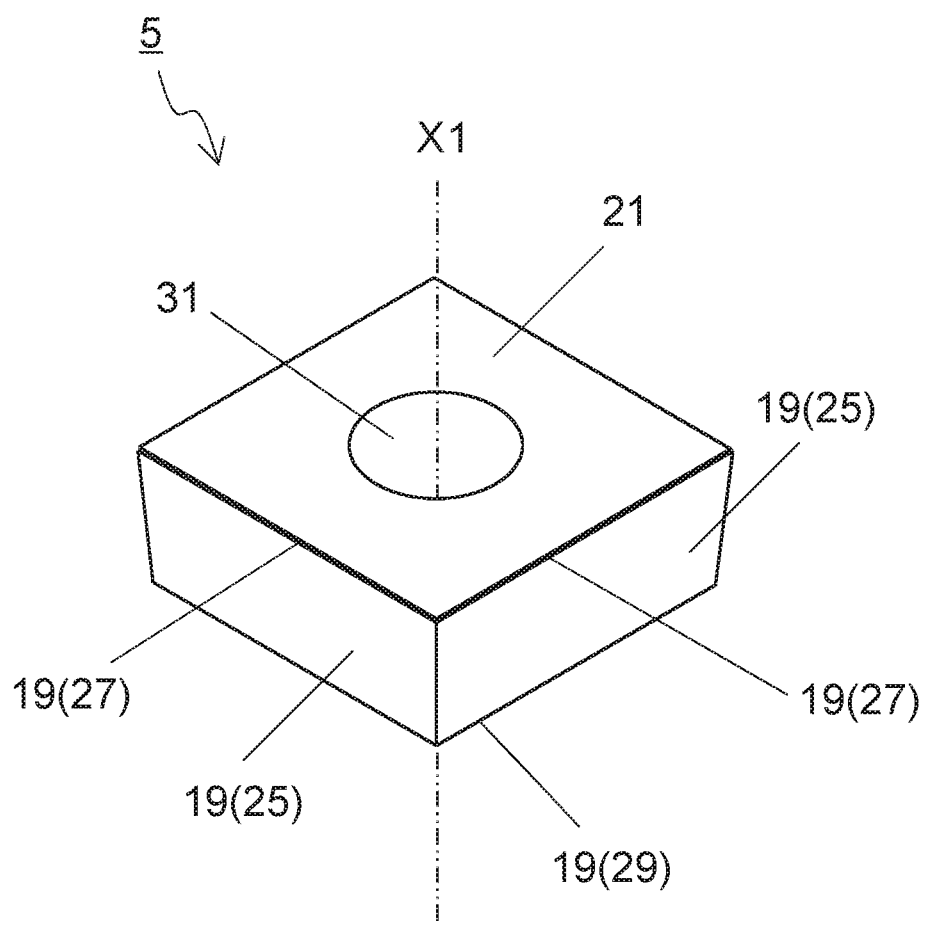
FIG. 2 is a perspective view illustrating a first insert in a first non-limiting embodiment.

The first insert 5 in the first non-limiting embodiment, which is a non-limiting embodiment of the first insert, includes a first base member 19 and a first resin layer 21 as illustrated in FIG. 2. The first insert 5 includes a first surface 23 including a rake surface region, a second surface 25 which is adjacent to the first surface 23 and includes a flank surface region, and a cutting edge 27. The first surface 23 and the second surface 25 are hereinafter referred to as the upper surface 23 and the side surface 25, respectively.

The first insert 5 includes a third surface 29 located on opposite side of the upper surface 23 and adjacent to the side surface 25. The third surface 29 is hereinafter referred to as the lower surface 29. In other words, the side surface 25 is a surface region located between the upper surface 23 and the lower surface 29.

The cutting edge 27 is located in at least a part of a ridge line which the upper surface 23 intersects with the side surface 25. The cutting edge 27 may be located over the entirety of the ridge line which the upper surface 23 intersects with the side surface 25. The cutting edge 27 in the first insert 5 corresponds to the inner cutting edge in the cutting tool 1.

The upper surface 23 includes a rake surface region, and the side surface 25 includes a flank surface region in the present non-limiting embodiment. When the side surface 25 includes the rake surface region and the upper surface 23 includes the flank surface region, the side surface 25 serves as the first surface, and the upper surface 23 serves as the second surface.

A so-called honing process may be applied to a part of the ridge line which the upper surface 23 intersects with the side surface 25 and the cutting edge 27 is located. By applying the honing process thereto, the ridge line along which the upper surface 23 intersects with the side surface 25 is no longer a strict line shape formed by intersection of two surfaces. Strength of the cutting edge 27 can be improved by applying the honing process. No problem occurs even when the honing process is applied to a part of the ridge line which the upper surface 23 intersects with the side surface 25, and which is not used as the cutting edge 27.

Figure 3:
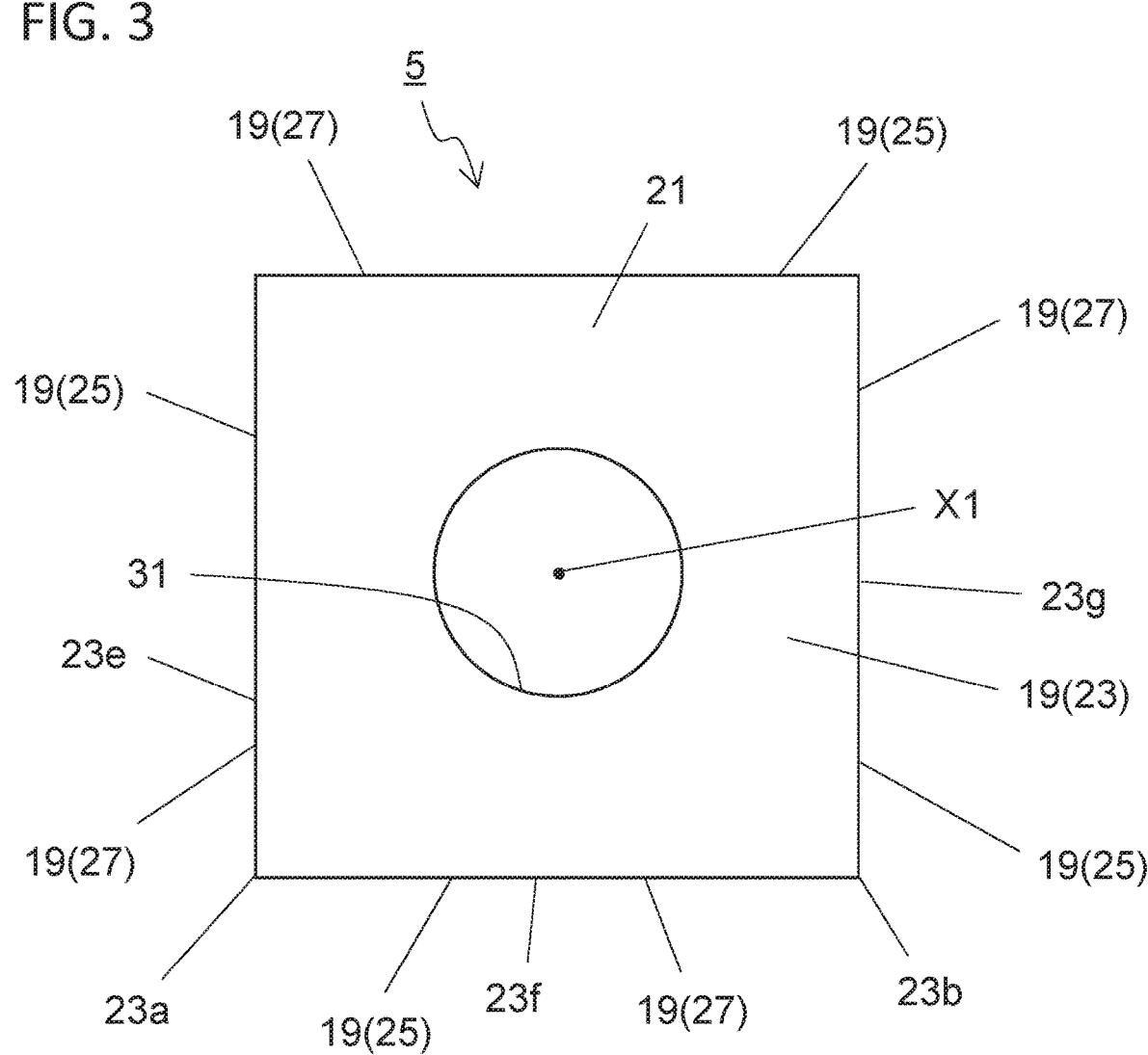
FIG. 3 is a plan view of the insert illustrated in FIG. 2.

The upper surface 23 has a polygonal shape including a plurality of corners and a plurality of sides. The upper surface 23 in the present non-limiting embodiments has an approximately quadrangular shape as illustrated in FIG. 3. Accordingly, the upper surface 23 includes four corners and four sides. The four corners and the four sides are located so as to have 90° rotational symmetry around a central axis X1 in a top view. The four corners include a first corner 23a and a second corner 23b.

The polygonal shape does not denote a strict polygonal shape. For example, each of the four corners of the upper surface 23 in the present non-limiting embodiment may not be a strict corner and have a rounded shape in a top view. Each of the four sides may not have a strict straight line shape.

As illustrated in FIG. 2 and the like, the lower surface 29 is a surface located on opposite side of the upper surface 23. The lower surface 29 is capable of functioning as a seating surface with respect to the first pocket 11 when the first insert 5 is attached to the holder 3. Similarly to the upper surface 23, the lower surface 29 in the present non-limiting embodiment has a polygonal shape being slightly smaller than that of the upper surface 23. An outer peripheral edge of the lower surface 29 is therefore invisible due to the upper surface 23 in a plan view illustrated in FIG. 3.

The shapes of the upper surface 23 and the lower surface 29 are not limited to the above non-limiting embodiment. Although the upper surface 23 and the lower surface 29 have the approximately quadrangular shape in the first insert 5 of the present non-limiting embodiment, the upper surface 23 and the lower surface 29 may have, for example, a triangular shape, a pentagonal shape, hexagonal shape, or an octagonal shape. Although the upper surface 23 in the present non-limiting embodiment has an approximately square shape, the quadrangular shape is not limited thereto. The upper surface 23 may have, for example, a rhombus or rectangular shape.

Figure 4:
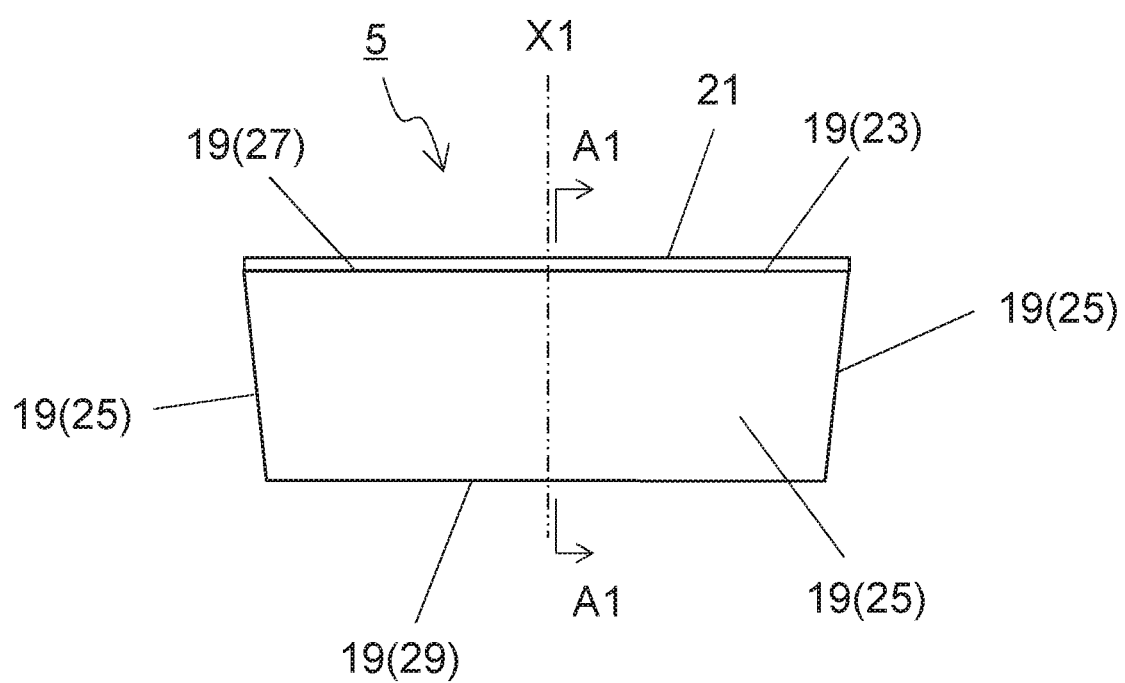
FIG. 4 is a side view of the insert illustrated in FIG. 2.
Figure 5:
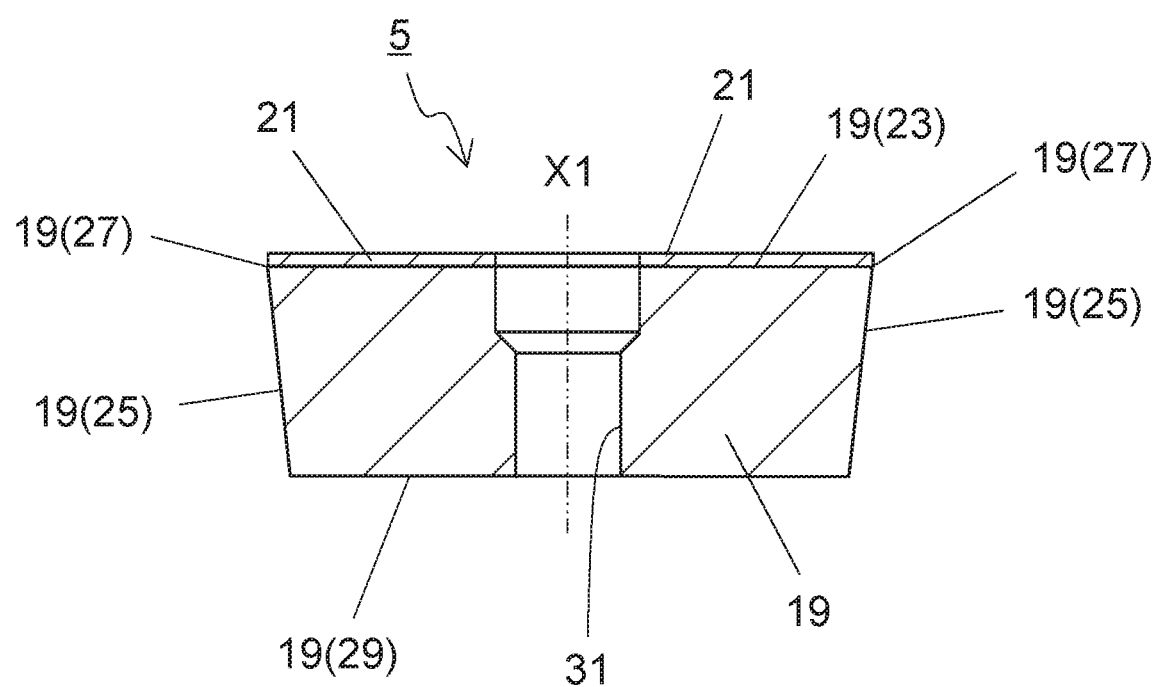
FIG. 5 is a sectional view taken along line A1-A1 in the insert illustrated in FIG. 4.

The side surface 25 is located between the upper surface 23 and the lower surface 29, and connects to the upper surface 23 and the lower surface 29 as illustrated in FIGS. 4 and 5. When the lower surface 29 has a slightly smaller shape than the upper surface 23 as described above, the side surface 25 in a side view has a trapezoidal shape. In other words, a longitudinal side of the side surface 25 in the side view illustrated in FIG. 4, or the side surface 25 in the sectional view illustrated in FIG. 5 is inclined so as to approach the central axis X1 as going from a side of the upper surface 23 toward a side of the lower surface 29.

A maximum width of the first insert 5 in the present non-limiting embodiment in a top view is settable to, for example, 6-25 mm. A height from the lower surface 29 to the upper surface 23 is settable to, for example, 1-10 mm. The height from the lower surface 29 to the upper surface 23 denotes a length in a direction parallel to the central axis X1 in between an upper end of the upper surface 23 and a lower end of the lower surface 29.

The configurations of the upper surface 23, the lower surface 29, and the side surface 25 are not limited to the above configurations. For example, the lower surface 29 may have the same shape as the upper surface 23, and an outer periphery of the lower surface 29 may be overlapped with an outer periphery of the upper surface 23 in a planar perspective. In this case, the side surface 25 is located orthogonal to the lower surface 29.

The first insert 5 in the present non-limiting embodiment includes a through hole 31 that opens in a center of the upper surface 23 and in a center of the lower surface 29 as illustrated in FIG. 2. A screw is insertable into the though hole 31 when the first insert 5 is screwed into the holder of the cutting tool. Because the lower surface 29 is a flat surface in the present non-limiting embodiment, an extending direction, namely, a penetrating direction of the through hole 31 is orthogonal to the lower surface 29.

Examples of material of the first base member 19 include inorganic materials, such as cemented carbide, cermet, and ceramics. The material of the first base member 19 is not limited thereto.

Examples of composition of cemented carbide include WC—Co, WC—TiC—Co, and WC—TiC—TaC—Co. Here, WC, TiC, and TaC are hard particles, and Co is a binder phase.

Cermet is a sintered composite material obtained by compositing metal into a ceramic ingredient. Specific examples of cermet include a titanium compound composed mainly of titanium carbide (TiC) or titanium nitride (TiN).

A surface of the first base member 19 may be coated with a coating film by using chemical vapor deposition (CVD) method or physical vapor deposition (PVD) method. Examples of composition of the coating film include titanium carbide, titanium nitride, titanium carbonitride (TiCN), and alumina ($Al_2O_3$). When the first base member 19 is coated with the coating film, the coating film and the first resin layer 21 are located in order from a side of the first base member 19 on the upper surface 23.

The first insert 5 in the present non-limiting embodiment includes the first base member 19 and the first resin layer 21 located on the first base member 19. Here, the first resin layer 21 is located on the upper surface 23 but not located on the side surface 25. Although the first insert 5 is attachable to and detachable from the holder 3, it becomes easier to determine whether the first insert 5 is not yet used or already used because the first resin layer 21 is located on the upper surface 23.

The reason for this is as follows. When the insert 5 is not yet used, the first resin layer 21 is located on the upper surface 23. When the insert 5 is already used, at least a part of the first resin layer 21 (for example, a part of the upper surface 23 which is located close to the cutting edge 27) is peeled off from the first base member 19.

The first resin layer 21 located on the upper surface 23 including the rake surface region is peeled off from the first base member 19 due to chips passing along the rake surface region during a cutting process using the first insert 5. It is therefore easy to determine whether the first insert 5 is already used or not depending on whether all or part of the first resin layer 21 is peeled off.

It is also possible to suitably finish a processing surface of a workpiece because the first resin layer 21 is not located on the side surface 25. When the first insert 5 is used in the cutting process in cases where the first resin layer 21 entirely coats the first base member 19, namely, the first resin layer 21 is also located on the side surface 25, the first resin layer 21 may come into contact with the processing surface of the workpiece, and the processing surface may become corrupted due to the contact. In contrast, because the first resin layer 21 is not located on the side surface 25 in the first insert 5 in the present non-limiting embodiment, the processing surface is less likely to become corrupted, thus leading to the well finished processing surface.

Additionally, because the first resin layer 21 is not located on the side surface 25, heat generated in the first base member 19 during the cutting process can be easily released from the side surface 25. It therefore becomes easier to avoid an excessive temperature rise of the first base member 19, thereby enhancing durability of the first base member 19.

The first resin layer 21 in the present non-limiting embodiment includes pigment and resin. When fluorescent pigment is contained as the pigment, it is possible to identify the position of the first insert 5 even in the dark. A solvent ingredient may be blended in addition to the pigment and the resin when forming the first resin layer 21.

Suitable organic pigments in pigments are azo pigments and polycyclic pigments. A suitable inorganic pigment is at least one selected from $TiO_2$, $Al_2O_3$, $SiO_2$, $ZnO_2$, $BaSO_4$, and $CaCO_3$.

As resin constituting the first resin layer 21, one which is joinable to a surface of the first base member 19 is selectable. Usable resin is, for example, acrylic resin, epoxy resin, silicone resin, polyethylene terephthalate, polybutylene terephthalate, polyethylene naphthalate, polystyrene, polycarbonate, polyethersulfone, cellulose acetate, polyarylate, or derivatives of these materials. Flluorocarbon polymers, such as polytetrafluoroethylene (PTFE), polychlorotrifluoroethylene (PCTFE), and perfluoroalkoxy alkane (PFA), are also selectable.

The first resin layer 21 is formable by, for example, a UV printer or inkjet printer. The use of one of these printers makes it easier to change a printing pattern. For example, it is possible to perform printing so as to ensure distinction based on a part number of the insert. It is also possible to apply marking to identify corners in the case of including a plurality of corners as in the upper surface 23 in the present non-limiting embodiment. Particularly, the use of the UV printer reduces fixing time when the first resin layer 21 is coated, thus leading to a simple process of operation. The first resin layer 21 may be formed with another method, such as a method of applying paste containing pigment with a brush.

When the first resin layer 21 is formed by the UV printer or the inkjet printer, the first resin layer 21 may be formed by carrying out printing only one time or a plurality of times. Alternatively, different kinds of pigments may be used when performing printing a plurality of times.

An arithmetic mean roughness of the first resin layer 21 may be greater than an arithmetic mean roughness of the upper surface 23. In cases where the arithmetic mean roughness of the first resin layer 21 is relatively great, chips tend to be caught by the first resin layer 21 during use of the first insert 5. The first resin layer 21 therefore tends to peel off from the first base member 19. This makes it easier to determine whether the first insert 5 is already used or not.

When an arithmetic mean roughness of the upper surface 23 including the rake surface region is relatively small, chips tend to pass along the rake surface region after the first resin layer 21 is peeled off. It is therefore possible to minimize heat generated in the rake surface region, thereby enhancing the durability of the first base member 19.

Figure 6:
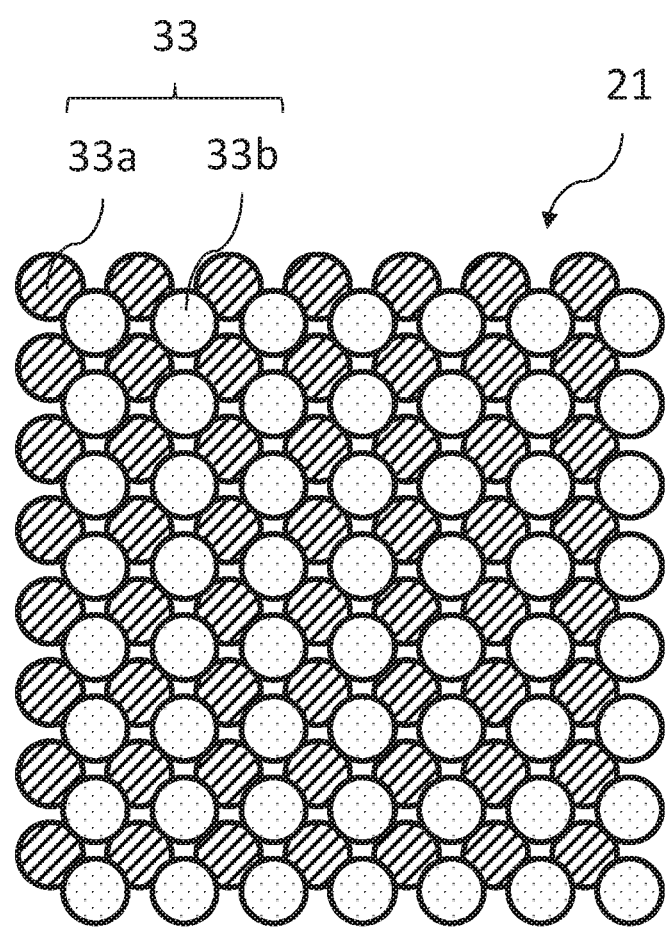
FIG. 6 is a schematic diagram enlargedly illustrating a resin layer in FIG. 3.

As illustrated in FIG. 6, the first resin layer 21 may be composed of aggregation of a plurality of island-shaped projections 33. Because the first resin layer 21 has a great arithmetic mean roughness when the first resin layer 21 is composed of the aggregation of island-shaped projections 33, the first resin layer 21 tends to peel off from the first base member 19. The first resin layer 21 can be composed of the aggregation of the island-shaped projections 33 by using, for example, the UV printer or the inkjet printer.

Alternatively, the aggregation of the island-shaped projections 33 may include first island-shaped projections 33a and second island-shaped projections 33b which are different in composition as in the case of the non-limiting embodiment illustrated in FIG. 6. When the island-shaped projections 33 include a height of 1-50 μm and the first resin layer 21 includes an arithmetic mean roughness of 1-5 μm, cutting fluid tends to stay on the upper surface 23, thus leading to improved chip discharge performance.

Figure 7:
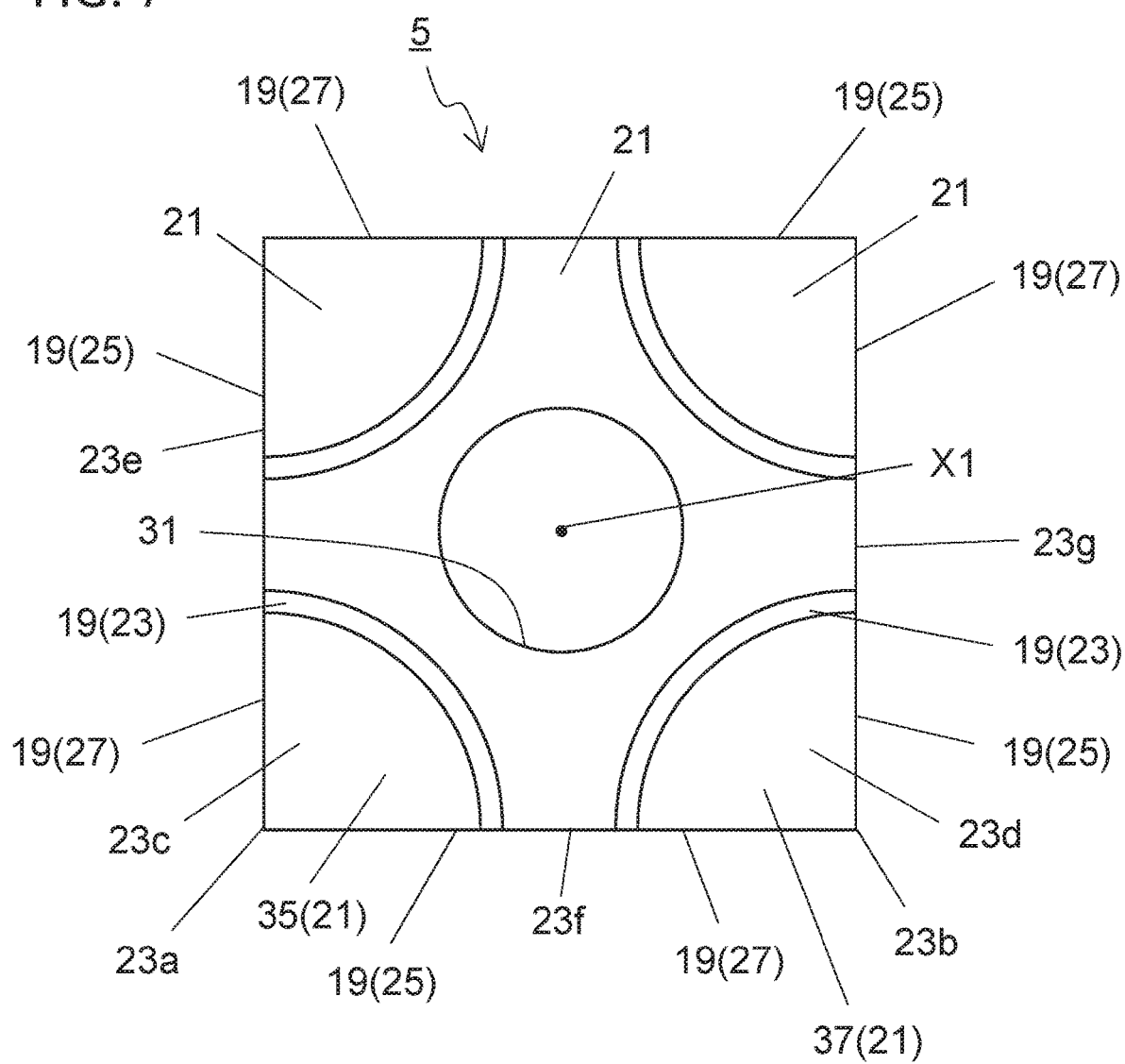
FIG. 7 is a top view of a first modified embodiment of the insert illustrated in FIG. 3.

The first resin layer 21 located on the upper surface 23 may be entirely located on the upper surface 23 as in the non-limiting embodiment illustrated in FIG. 3, or alternatively may be located at a part of the upper surface 23 as in a non-limiting embodiment illustrated in FIG. 7. The first resin layer 21 in the present non-limiting embodiment is located in at least a region along the cutting edge 27 on the upper surface 23.

When the first resin layer 21 is located in at least the region along the cutting edge 27, chips tend to come into contact with the first resin layer 21. Consequently, the first resin layer 21 tends to peel off due to the chips from the first base member 19. Because the first resin layer 21 tends to peel off during use of the first insert 5, it is easy to determine whether the first insert 5 is already used or not.

A color of the first resin layer 21 is not limited to a specific color. However, when the color of the first resin layer 21 is different from a color of the first base member 19, it is easy to visually check peeling-off of the first resin layer 21. When the surface of the first base member 19 is coated with the coating film of titanium carbide or the like, it is easy to visually check the peeling-off of the first resin layer 21 because the color of the first resin layer 21 is different from a color of the coating film.

Because the color of each of the first base member 19 and the coating film is determined according to composition and thickness thereof, it is difficult to freely change the color. In contrast, a color of the first resin layer 21 can be changed freely only by changing pigment. Furthermore, the first resin layer 21 can be formed without being excessively restricted by a state of a base (the surface of the first base member 19). The first resin layer 21 is therefore less subject to restrictions of the kind of the first base member 19 and the kind of the coating film.

The above "color" is defined by JISZ8721, and is specified according to hue, brightness, and saturation. The phrase that two colors are different from each other denotes that a difference in at least one of hue, brightness, and saturation is 0.5 or more. When a difference in at least one of hue, brightness, and saturation is 0.5 or more in the first resin layer 21 compared with the first base member 19 or the coating film, it becomes easier to determine whether the first resin layer 21 is already peeled off.

The upper surface 23 in the present non-limiting embodiment includes four corners including the first corner 23a and the second corner 23b. One of the four corners is used during a single cutting process. For example, when the cutting edge 27 located at the first corner 23a is worn out, the first insert 5 is temporarily removed from the holder, and is attached again to the holder in a state in which the insert 5 is rotated 90° around the rotation axis X1. This makes it possible to use the cutting edge 27 located at the second corner 23b being different from the first corner 23a.

The upper surface 23 in the non-limiting embodiment illustrated in FIG. 7 includes a first region 23c including the first corner 23a, and a second region 23d including the second corner 23b. Here, the first region 23c and the second region 23d are located away from each other. The first resin layer 21 includes a first layer 35 located on the first region 23c, and a second layer 37 located on the second region 23d. Accordingly, the second layer 37 is located away from the first layer 35.

When the second layer 37 is located away from the first layer 35, the cutting process is carried out using the cutting edge 27 located at the first corner 23a. Even when the first layer 35 is peeled off, it is easy to avoid that the second layer 37 is also peeled off due to influence of peeling-off of the first layer 35. It is therefore less likely to be misunderstood that the cutting edge 27 located at the second corner 23b is already used even though the cutting edge 27 is not yet used.

Figure 8:
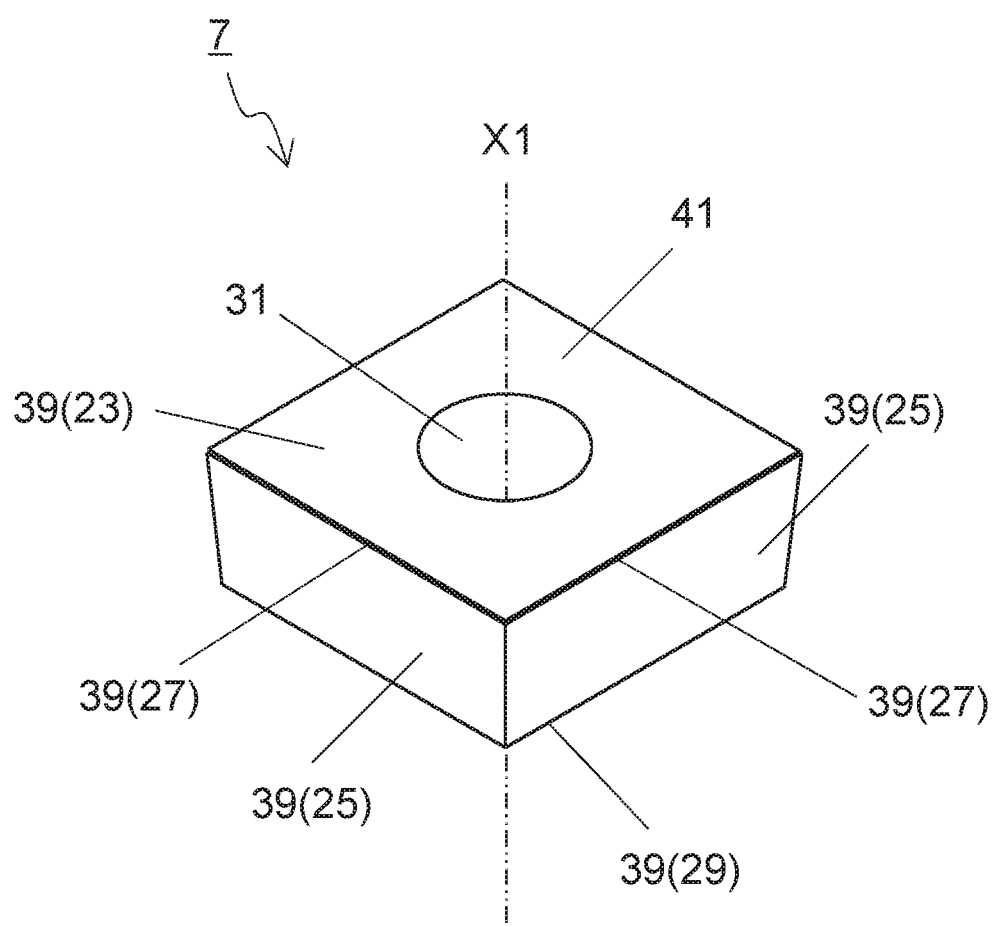
FIG. 8 is a perspective view illustrating a second insert in FIG. 1.
Figure 9:
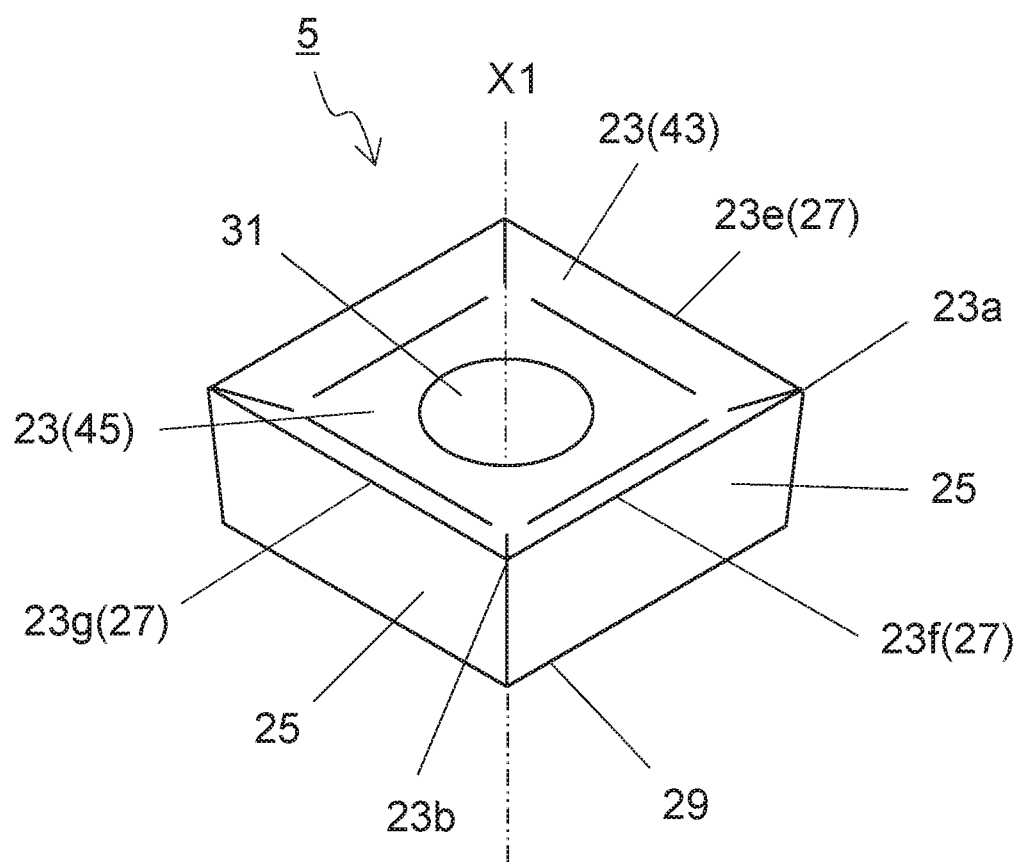
FIG. 9 is a perspective view illustrating a first insert in a second non-limiting embodiment.
Figure 10:
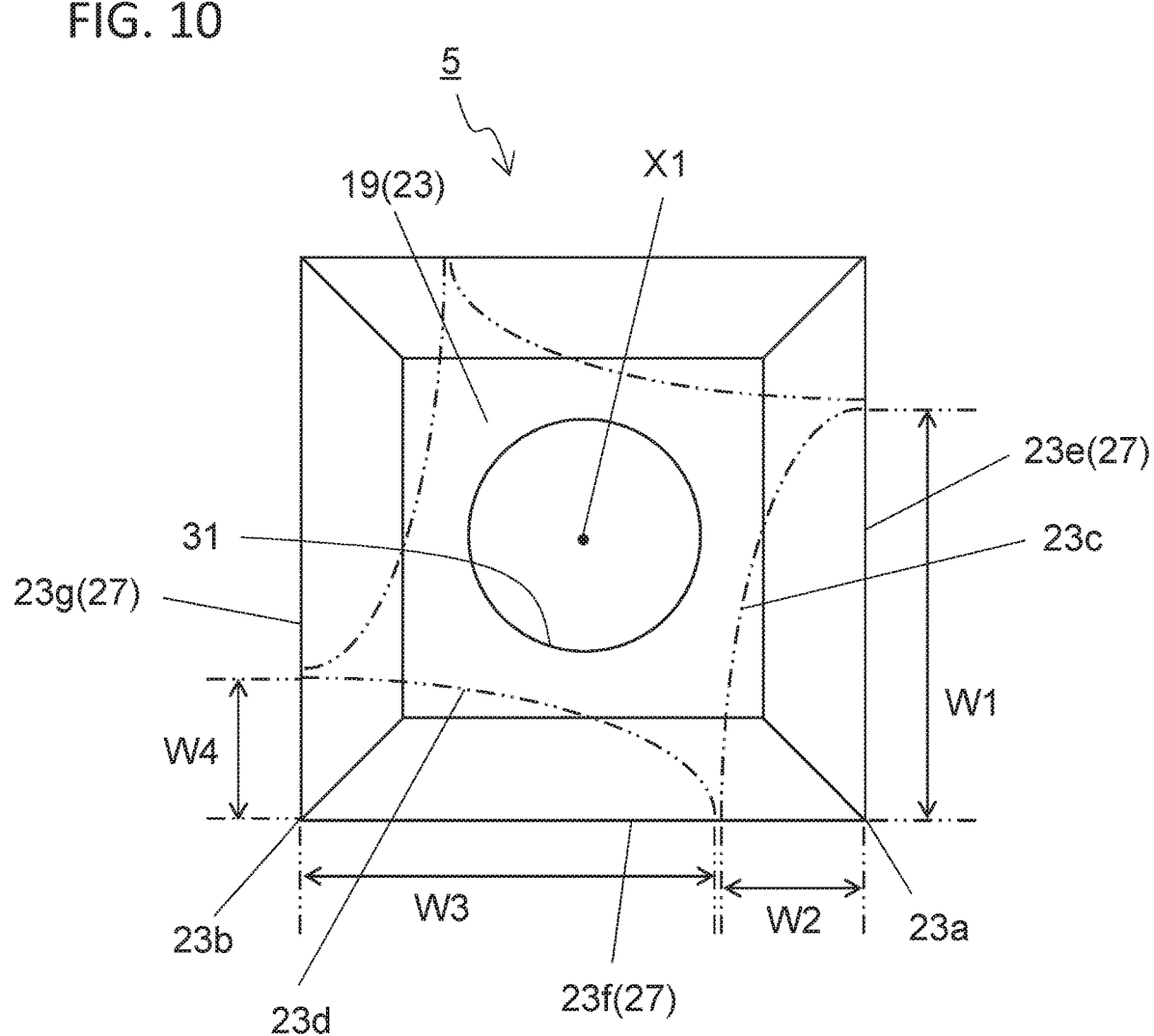
FIG. 10 is a plan view illustrating a base member in FIG. 9.

The second insert 7 is described in detail below with reference to FIG. 8.

The second insert 7 in the present non-limiting embodiment includes a second base member 39 and a second resin layer 41. Similarly to the first base member 19, the second base member 39 includes an upper surface 23, a side surface 25, and a cutting edge 27. The cutting edge 27 in the second insert 7 corresponds to the outer cutting edge described above. The second base member 39 in the present non-limiting embodiment has approximately the same shape as the first base member 19 even although there is a slight difference therebetween. Examples of material of the second base member 39 include inorganic materials, such as cemented carbide, cermet, and ceramics, as in the case of the first base member 19.

The term "slight difference" denotes that the first base member 19 and the second base member 39 are different in shape but are similar in appearance form to such a degree that it is difficult to visually distinguish between the first base member 19 and the second base member 39. The shape of the second base member 39 is not limited to the above configuration. The second base member 39 may have an apparently different shape from that of the first base member 19, or may have the same shape as the first base member 19.

Similarly to the first resin layer 21 in the first insert 5, the second resin layer 41 is located on the upper surface 23 of the second base member 39 but not located on the side surface 25 of the second base member 39. It is therefore easy to determine whether the second insert 7 is already used or not. A material for the second resin layer 41 may be the same as that of the first resin layer 21.

The second base member 39 in the present non-limiting embodiment has approximately the same shape as the first base member 19 as described above, and the first insert 5 and the second insert 7 are similar in appearance form. When a color of the first resin layer 21 is different from a color of the second resin layer 41, it is easy to visually distinguish between the first insert 5 and the second insert 7. Consequently, misattachment of the first insert 5 and the second insert 7 is avoidable.

As another non-limiting embodiment of the first insert, a first insert 5 of a second non-limiting embodiment is described in detail below. The following description of the second non-limiting embodiment is focused on differences from the first insert 5 of the first non-limiting embodiment, and descriptions of configurations similar to those in the first insert 5 of the first non-limiting embodiment are omitted here.

Figure 15:
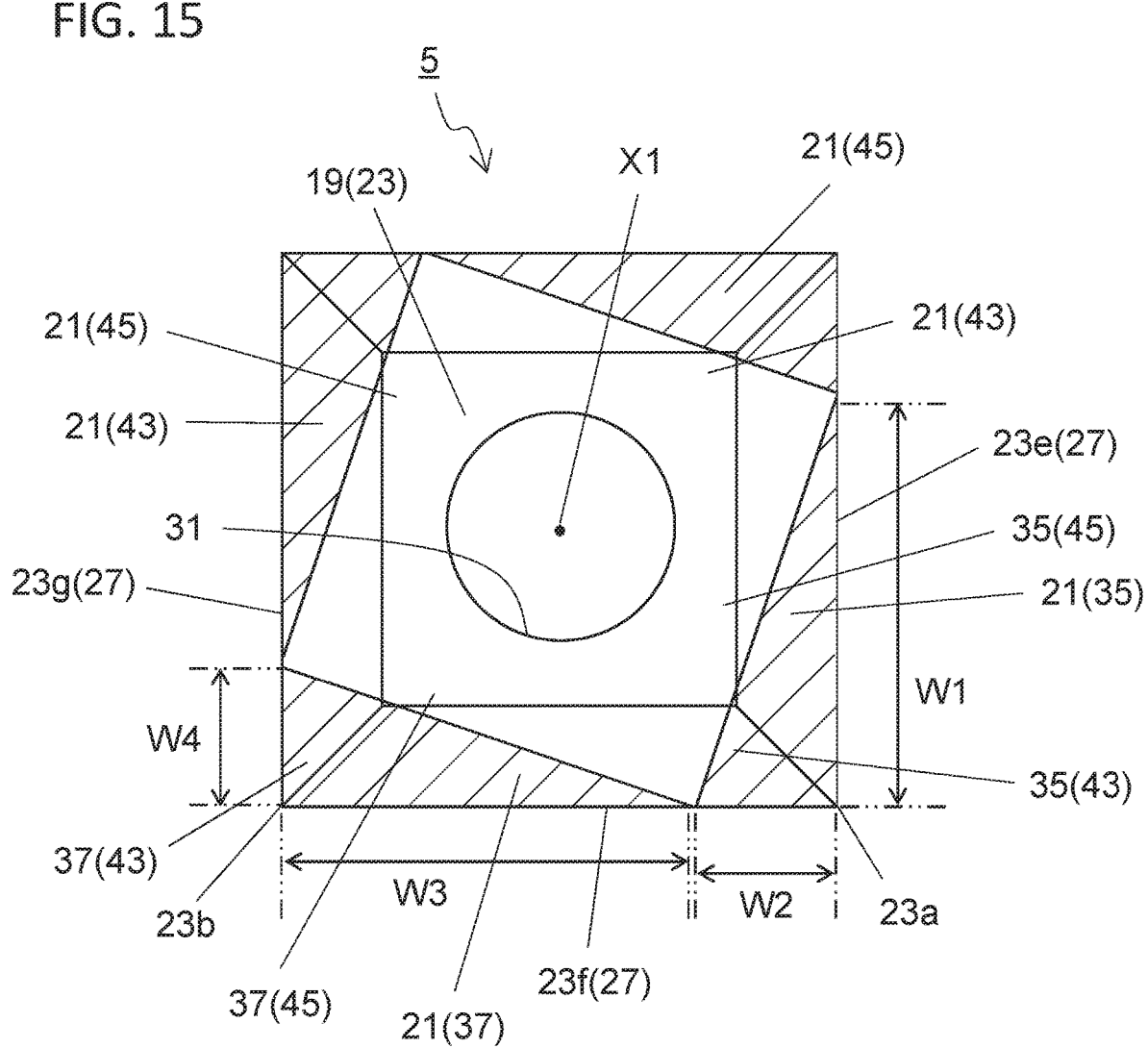
FIG. 15 is a plan view of a second modified non-limiting embodiment of the insert illustrated in FIG. 10.

Similarly to the first insert 5 of the first non-limiting embodiment, the insert 5 of the second non-limiting embodiment, which is a non-limiting embodiment of the first insert, includes a cutting edge 27 located in at least a part of a ridge line which a first surface 23 (upper surface 23) intersects with a second surface 25 (side surface 25). The first insert 5 of the present non-limiting embodiment includes a first resin layer 21 located on the upper surface 23 in a first base member 19. To make a position of the first resin layer 21 clearly understandable, diagonal lines are drawn on the first resin layer 21 in FIGS. 11, 12, and 15, each of which is, however, not a cross section.

The upper surface 23 in the present non-limiting embodiment includes a first side 23e and a second side 23f. The first corner 23a is located between the first side 23e and the second side 23f. The first resin layer 21 includes a first layer 35 in a region including the first corner 23a, the first side 23e, and the second side 23f. Here, a region in the upper surface 23 at which the first layer 35 is located is referred to as a first region 23c. The first region 23c includes at least a part of a rake surface region in the upper surface 23.

In the first layer 35 in the insert 5 of the present non-limiting embodiment, a width W1 in a direction along the first side 23e is greater than a width W2 in a direction along the second side 23f in a top view. The first insert 5 of the present non-limiting embodiment satisfying the above configuration ensures a large area where the cutting edge 27 is protectable, and also makes it easy to check whether the first insert 5 is already used or not.

When the cutting edge 27 located at the first side 23e adjacent to the first corner 23a is positioned at a side of an outer periphery, and the cutting edge 27 located at the second side 23f adjacent to the first corner 23a is positioned at a side of a front end 3a in a milling process using the first corner 3a in a cutting tool including the first insert 5 of the present non-limiting embodiment, a length of the cutting edge 27 in a direction along the first side 23e is usually greater than a length of the cutting edge 27 in a direction along the second side 23f.

In the first layer 35 in the first insert 5 of the present non-limiting embodiment, the area where the cutting edge 27 is protectable can be increased when the width W1 in the direction along the first side 23e is greater than the width W2 in the direction along the second side 23f in a top view.

The first layer 35 may be configured so that the width W1 in the direction along the first side 23e decreases as separating from the first side 23e in a top view. Because cutting load applied to the first layer 35 decreases as going further away from the first side 23e, the first layer 35 is therefore less likely to peel off as going further away from the first side 23e. However, when the width W1 in the direction along the first side 23e is set as described above, the first layer 35 tends to peel off even in a region away from the first side 23e. Therefore, it becomes easier to determine whether the first insert 5 is already used or not.

Alternatively, the first layer 35 may have such a configuration that the width W2 in the direction along the second side 23f decreases as going further away from the second side 23f. Because cutting load exerted on the first layer 35 decreases as going further away from the second side 23f, the first layer 35 is less likely to peel off as going further away from the second side 23f. However, when the width W2 in the direction along the second side 23f is set as described above, the first layer 35 tends to peel off even in a region away from the second side 23f. Therefore, it becomes easier to determine whether the first insert 5 is already used or not.

Figure 11:
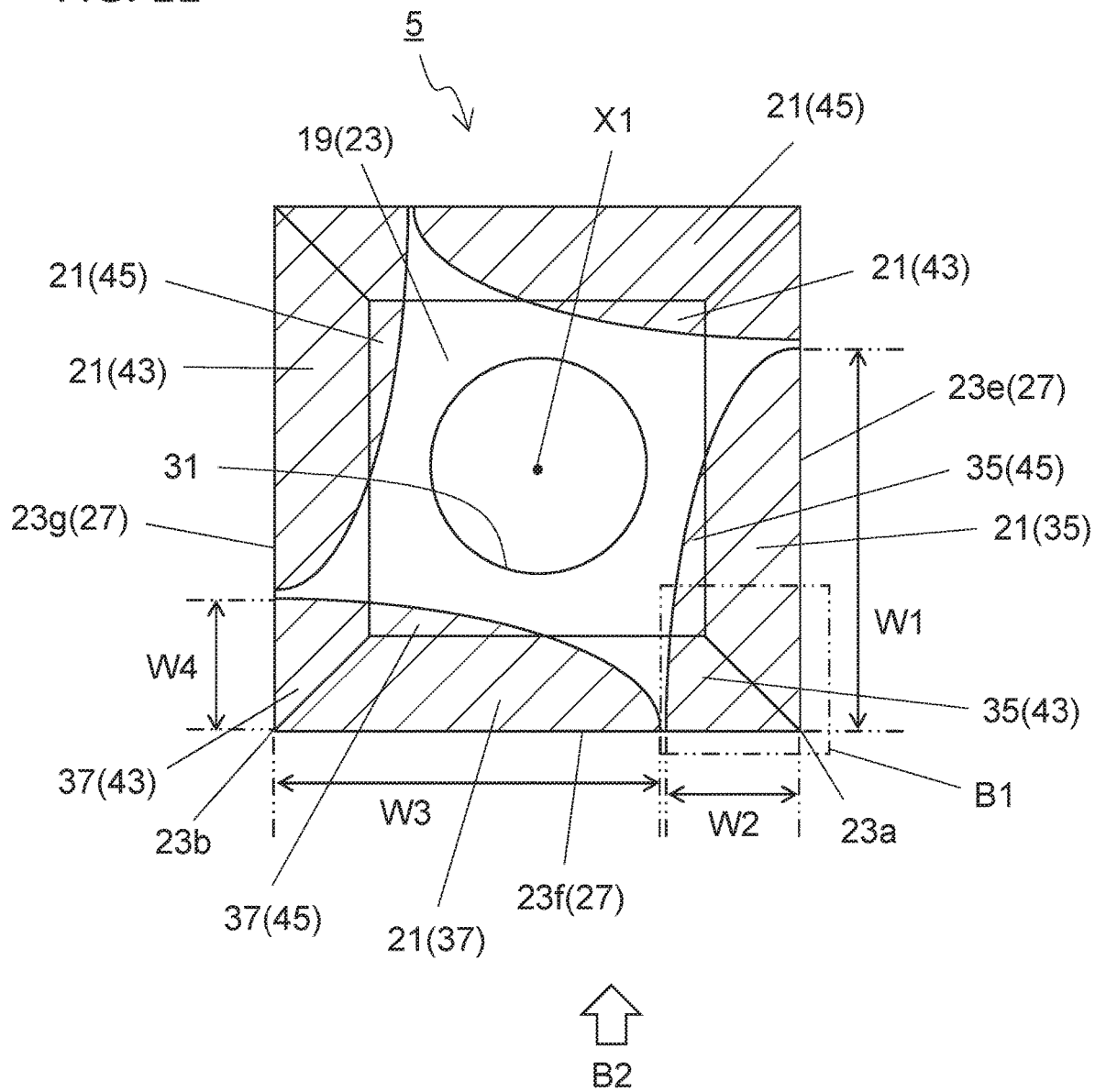
FIG. 11 is a plan view of the first insert illustrated in FIG. 9.
Figure 12:
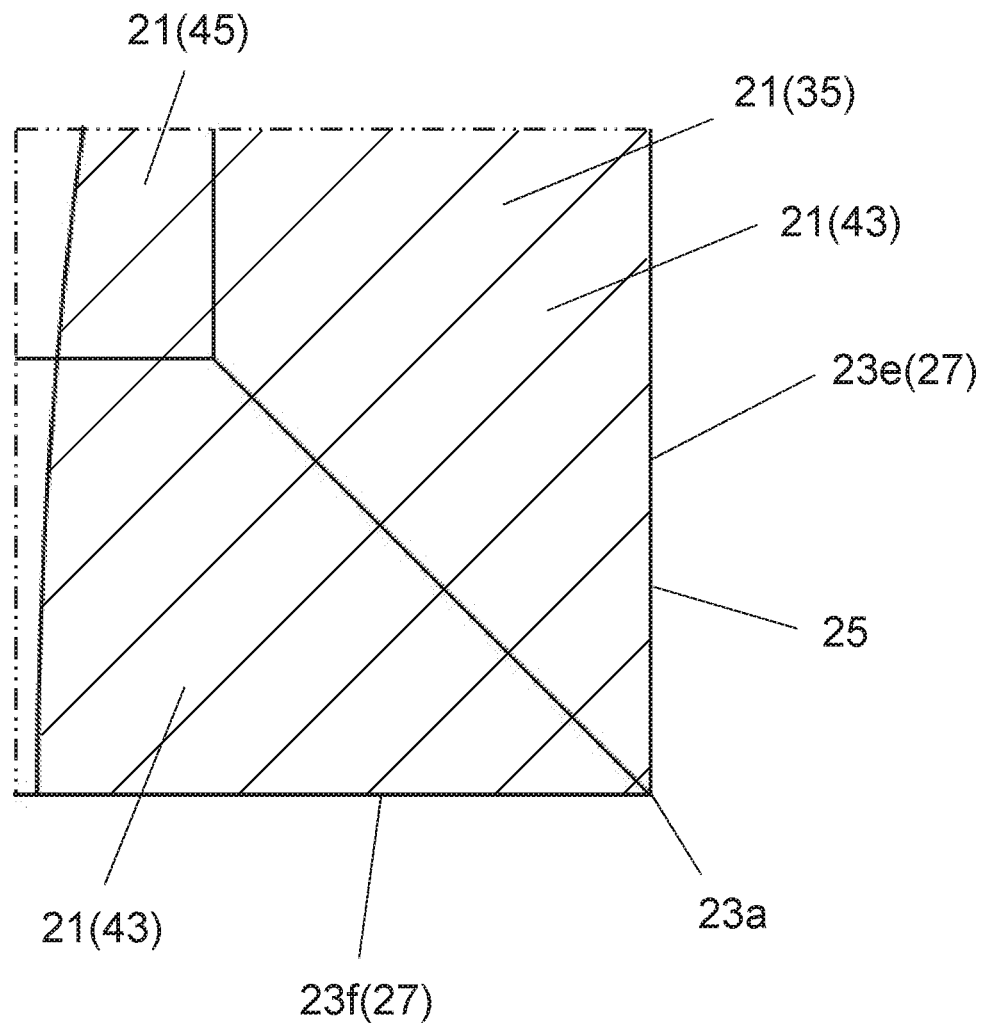
FIG. 12 is an enlarged view of a region B1 illustrated in FIG. 11.
Figure 13:
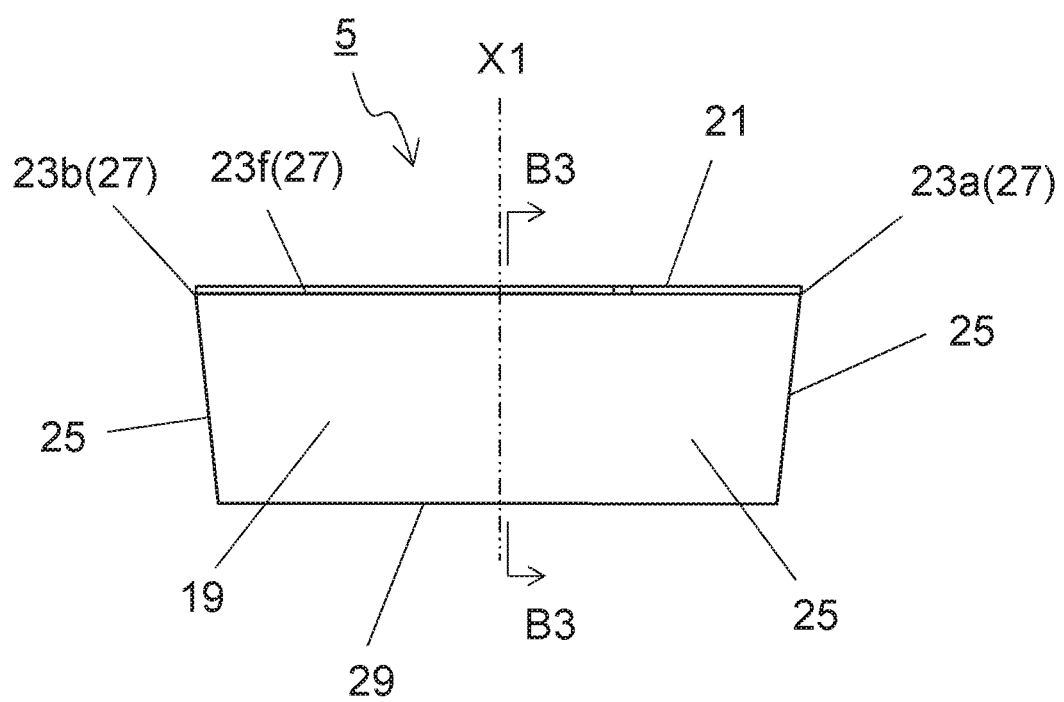
FIG. 13 is a side view when the insert illustrated in FIG. 11 is viewed from B2 direction.
Figure 14:
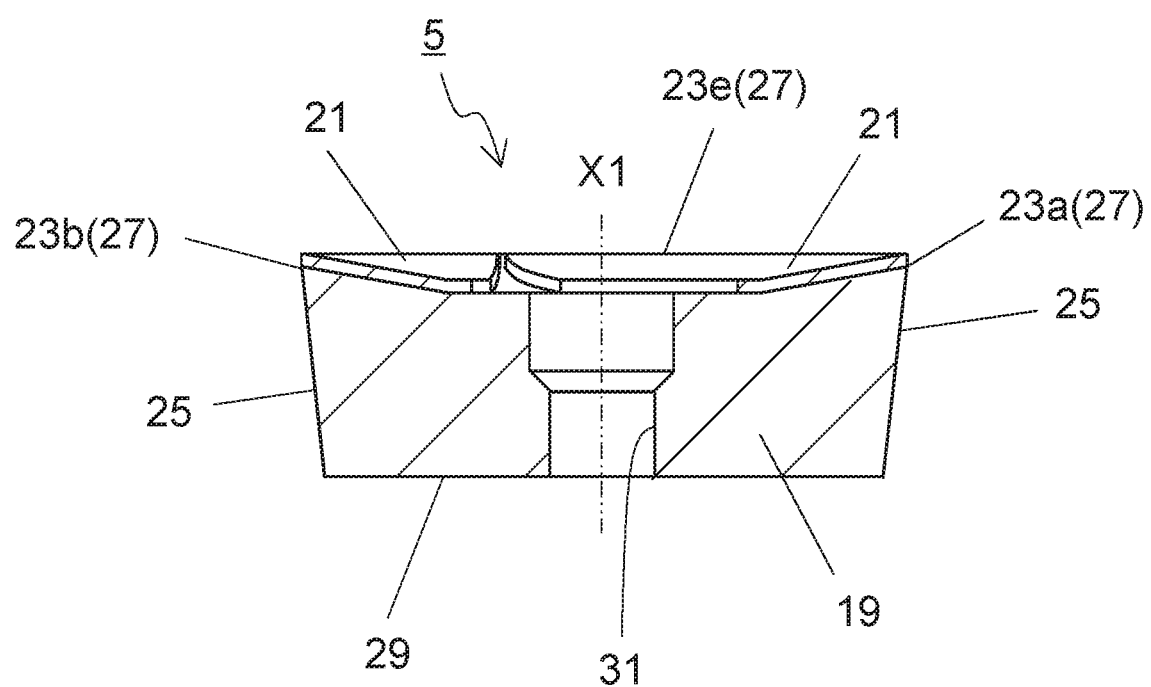
FIG. 14 is a sectional view taken along line B3-B3 of the insert illustrated in FIG. 13.

The first region 23c in one non-limiting embodiment illustrated in FIG. 11 includes an outer region 43 and an inner region 45 located inside the outer region 43. The outer region 43 is inclined so as to approach the lower surface 29 as going further away from the first corner 23a. The inner region 45 includes a smaller inclination angle relative to the lower surface 29 than the outer region 43. Here, a thickness of the first layer 35 located on the outer region 43 is smaller than a thickness of the first layer 35 located on the inner region 45.

When the thickness of the first layer 35 is configured as described above, it becomes easier to determine whether the first insert 5 is already used or not. This is because the thickness of the first layer 35 located on the outer region 43 closer to the cutting edge 27 than the inner region 45 is relatively small, thereby facilitating peeling-off of the first layer 35.

The upper surface 23 in the present non-limiting embodiment further includes a second corner 23b besides the first corner 23a. The upper surface 23 also further includes a third side 23g besides the first side 23e and the second side 23f. The second corner 23b is located between the second side 23f and the third side 23g. Accordingly, the second corner 23b is adjacent to the first corner 23a with the second side 23f interposed therebetween in the present non-limiting embodiment.

The upper surface 23 also includes a second region 23d besides the first region 23c. The second region 23d is a region in the upper surface 23 which includes the second corner 23b, the second side 23f, and the third side 23g. The second region 23d also includes at least a part of the rake surface region. Hence, when the second corner 23b is used instead of the first corner 23a in a cutting process, chips of a workpiece pass over the second region 23d.

The first resin layer 21 further includes a second layer 37 located in the second region 23d in addition to the first layer 35. A width W3 of the second layer 37 in a direction along the second side 23f is greater than a width W4 thereof in a direction along the third side 23g in a top view. An area where the cutting edge 27 is protectable can be further increased by including the second layer 37 having the above configuration.

Because the second region 23d is located away from the first region 23c and the second layer 37 is located away from the first layer 35, even when one of the first layer 35 and the second layer 37 peels off, the other of the first layer 35 and the second layer 37 becomes less likely to peel off.

As still another non-limiting embodiment of the first insert, a first insert 5 of a third non-limiting embodiment is described in detail below. The following description of the third non-limiting embodiment is focused on differences from the first insert 5 of the first non-limiting embodiment and the first insert 5 of the second non-limiting embodiment, and descriptions of configurations similar to those in the first insert 5 of the first non-limiting embodiment and the first insert 5 of the second non-limiting embodiment are omitted here.

Figure 16:
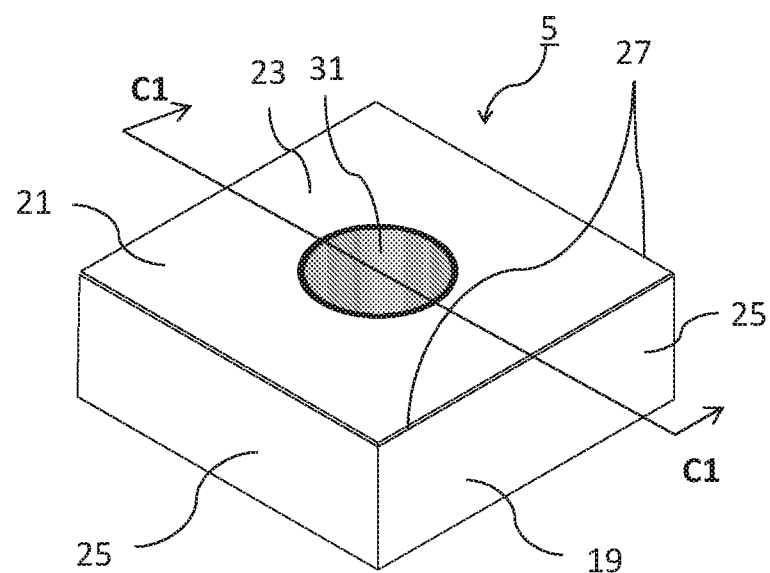
FIG. 16 is a perspective view illustrating a first insert in a third non-limiting embodiment.

Similarly to the first insert 5 of the first non-limiting embodiment, the first insert 5 of the third non-limiting embodiment, which is a non-limiting embodiment of the first insert, includes a through hole 31 that opens in a center of a first surface 23 (an upper surface 23) as illustrated in FIG. 16.

Figure 17:
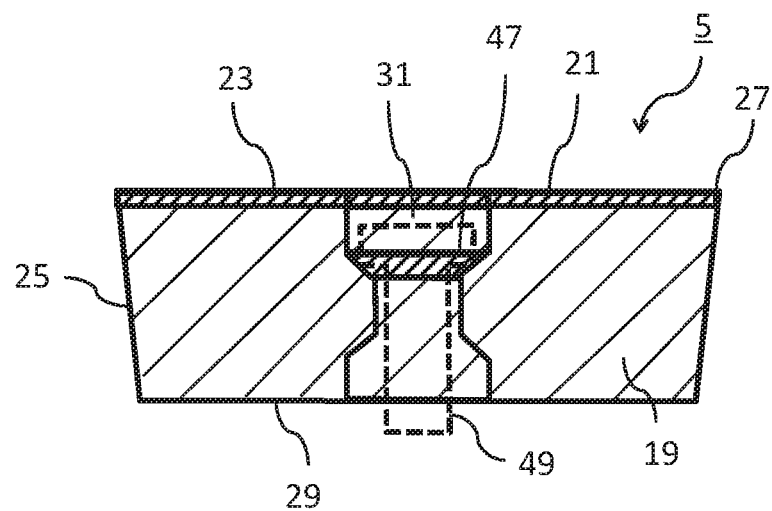
FIG. 17 is a sectional view taken along line C1-C1 of the insert illustrate in FIG. 16.

As illustrated in FIG. 17, the first insert 5 of the present non-limiting embodiment further includes as a resin layer, besides a first resin layer 21 located on the upper surface 23, a third resin layer 47 located on at least a portion of an inner wall surface of the through hole 31 with which a screw 49 comes into contact. The third resin layer 47 located at the above portion is capable of functioning as a cushioning material against great screwing force exerted due to an incorrect direction of the screw 49 when attaching or detaching the first insert 5. The insert 5 is therefore less likely to fracture from the through hole 31 brought into contact with the screw 49.

Crater wear is less likely to develop when the third resin layer 47 being a part of the resin layer which is located on an inner wall surface, is away from the first resin layer 21 being a part of the resin layer which is located on the upper surface 23 as illustrated in FIG. 17. This is because heat dissipation properties of the upper surface 23 can be enhanced even when the upper surface 23 has a high temperature due to passage of chips.

Although the inserts and the cutting tools in the plurality of embodiments have been described with reference to the drawings, the inserts and the cutting tools in the present invention are not limited to ones which respectively have the configurations of the above embodiments, but are intended to include modified embodiments which do not depart from the gist of the present invention and may not be particularly described in detail.

For example, even though the cutting tools in the above embodiments are drills, the cutting tools may be milling tools, such as end mills, or alternatively turning tools used for outer diameter machining.

Description of the Reference Numerals 1 cutting tool
3 holder
3a first end (front end)
3b second end (rear end)
5 first insert
7 second insert
9 main body
9a holding member
9b cutting member
11 first pocket
13 second pocket
15 first flute
17 second flute
19 first base member
21 first resin layer
23 first surface (upper surface)
23a first corner
23b second corner
23c first region
23d second region
23e first side
23f second side
23g third side
25 second surface (side surface)
27 cutting edge
29 third surface (lower surface)
31 through hole
33 island-shaped projection
33a first island-shaped projection
33b second island-shaped projection
35 first layer
37 second layer
39 second base member
41 second resin layer
43 outer region
45 inner region
47 third resin layer
49 screw

What is claimed is:

1. An insert, comprising:
a base member and a resin layer located on the base member, wherein
the base member comprises:
a first surface comprising a rake surface region,
a second surface which is adjacent to the first surface and comprises a flank surface region, and
a cutting edge located in at least a part of a ridge line at which the first surface intersects with the second surface,
wherein
the resin layer is not located on the second surface but located on the first surface, and
the resin layer comprises an aggregation of a plurality of island-shaped projections.

2. The insert according to claim 1, wherein
an arithmetic mean roughness of the resin layer is greater than an arithmetic mean roughness of the first surface.

3. The cutting insert according to claim 1, wherein
the resin layer is located along the cutting edge in the first surface.

4. The insert according to claim 1, wherein
a color of the resin layer is different from a color of the base member.

5. The insert according to claim 1, wherein
the first surface comprises a first region comprising a first corner and a second region comprising a second corner, and the first region is located away from the second region, and
the resin layer comprises a first layer located on the first region and a second layer located on the second region.

6. The insert according to claim 5, wherein
the first surface further comprises a first side located between the first corner and the second corner, and a second side adjacent to the first side with the first corner interposed therebetween, and
a width of the first layer in a direction along the second side is greater than a width of the first layer in a direction along the first side in a top view.

7. The insert according to claim 6, wherein
the first surface further comprises a third side adjacent to the first side with the second corner interposed therebetween, and
a width of the second layer in a direction along the first side is greater than a width of the second layer in a direction along the third side in a top view.

8. The insert according to claim 6, wherein
a width of the second layer in a direction along the first side is greater than the width of the first layer in a direction along the first side in a top view.

9. The insert according to claim 6, wherein
the width of the first layer in a direction along the second side decreases as going further away from the second side in a top view.

10. The insert according to claim 5, wherein
the base member comprises a third surface located on a side opposite the first surface,
the first surface further comprises
an outer region inclined so as to approach the third surface as going further away from the first corner, and
an inner region which is located inside the outer region and comprises a smaller inclination angle relative to the third surface than the outer region, and
a thickness of the resin layer located on the outer region is less than a thickness of the resin layer located on the inner region.

11. The insert according to claim 1, wherein
the base member comprises a through hole that opens in the first surface, and
the resin layer is located on at least a part of an inner wall surface of the through hole.

12. The insert according to claim 11, wherein
a part of the resin layer which is located on the inner wall surface is away from a part of the resin layer which is located on the first surface.

13. A cutting tool, comprising:
the insert according to claim 1, and
a holder comprising a first pocket configured to set the insert therein.

14. The cutting tool according to claim 13, further comprising:
a second insert, comprising:
a second base member and a second resin layer located on the second base member, wherein the second base member comprises:
- a third surface comprising a rake surface region,
- a fourth surface which is adjacent to the third surface and comprises a flank surface region, and
- a cutting edge located in at least a part of a ridge line at which the third surface intersects with the fourth surface, and the second resin layer is not located on the fourth surface but located on the third surface;

wherein the holder further comprises a second pocket configured to set the second insert therein.

15. The cutting tool according to claim 14, wherein
when the resin layer of the insert which is located in the first pocket is referred to as a first resin layer,
the second insert is located in the second pocket, and
a color of the first resin layer is different from a color of the second resin layer.

* * * * *